July 3, 1956
H. F. BUDZIEN
2,753,165
ENGINE FUEL SYSTEM
Filed Feb. 5, 1952
3 Sheets-Sheet 1
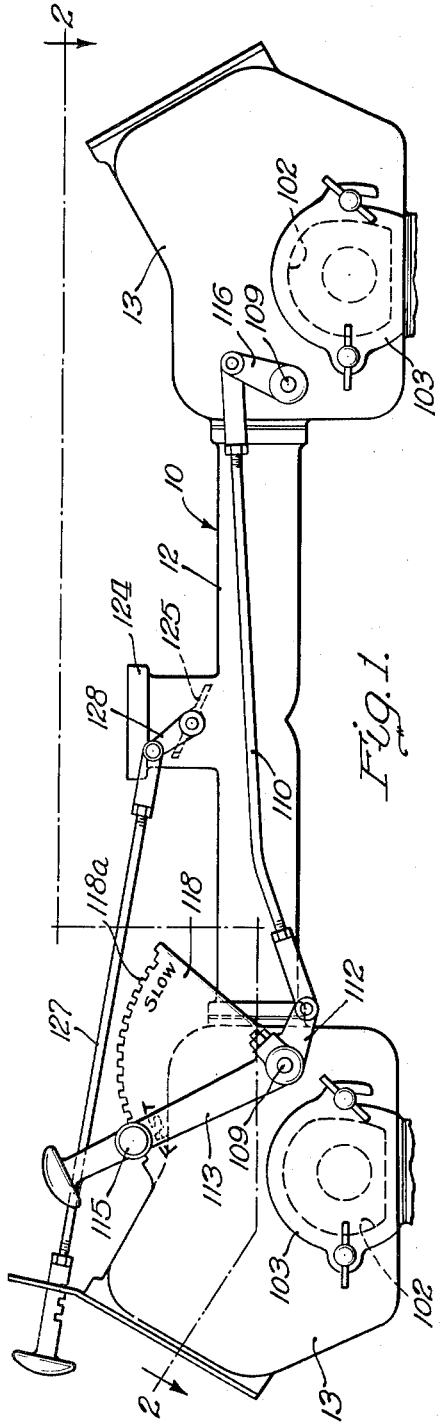
INVENTOR.
Hugo F. Budzien
BY
Paul L. Keohew
Atty.

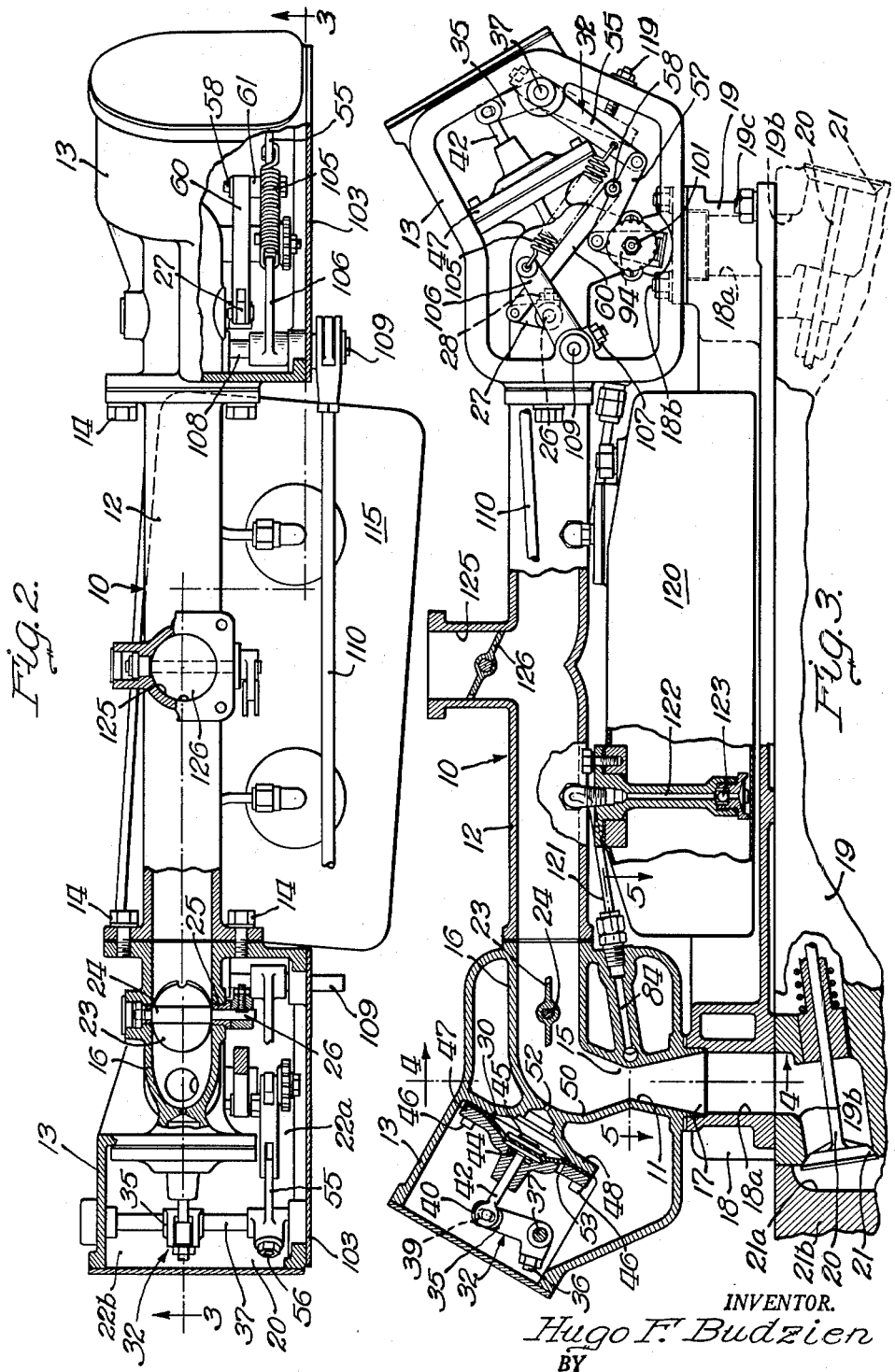

July 3, 1956

H. F. BUDZIEN 2,753,165

ENGINE FUEL SYSTEM

Filed Feb. 5, 1952

INVENTOR.
Hugo F. Budzien
BY
Paul L. Keehn
Atty.

United States Patent Office 2,753,165
Patented July 3, 1956

2,753,165

ENGINE FUEL SYSTEM

Hugo F. Budzien, Beloit, Wis., assignor to Fairbanks, Morse & Co., Chicago, Ill., a corporation of Illinois Application February 5, 1952, Serial No. 270,080

4 Claims. (Cl. 261—23)

This invention relates to improvements in fuel systems for gasoline engines. More particularly it has to do with a fuel system having an improved control means for obtaining an intimate combustible mixture of air and gasoline and a novel means of delivering the mixture to the combustion space of the engine.

The fuel system of the present invention is particularly adapted for use with a two cylinder gasoline engine in which the cylinders are so relatively disposed that the cylinder fuel intake ports thereof are spaced relatively far apart. With such an arrangement, the usual carburetor type fuel system wherein air and gasoline are mixed prior to delivery into a common intake manifold, provides an unsatisfactory distribution and delivery of the mxiture.

It is therefore an important object of the present invention to provide a novel fuel system for an internal combustion engine wherein in respect to each cylinder, the combustion air is mixed with the liquid fuel in a mixing chamber zone relatively close to the cylinder intake port.

Another object of the invention is to provide control means for the fuel system of a gasoline engine in which the volume of combustion air and the volume of fuel are automatically varied to provide a proper mixture over the load range of the engine by a member which is sensitive to the vacuum in the air intake manifold.

A further object of this invention is the provision of a manually-adjustable spring mechanism for controlling the amount of resistance that must be overcome by the vacuum-operated fuel-air mixture control to establish constant speed operation.

Another important object of the invention is to provide an improved engine fuel control system embodying air and fuel control means individual to the engine cylinders, wherein each control means is operable responsively to variations in the cylinder suction or intake vacuum of its associated cylinder, for regulating quantity admission of fuel and air and determining volumetric proportioning of these constituents in the fuel mixture delivered to the cylinder combustion space, such as automatically to adjust fuel mixture admission in correspondence with variations in engine loading.

A further object is to provide engine speed governing means for each of the aforementioned fuel and air quantity control means, adjustable for determining the degree of response of the control means to cylinder intake vacuum, whereby to permit speed-setting of the engine for operation at any desired speed, the governing provision as herein contemplated, including a manually operable control common to the several governing means for effecting simultaneously, corresponding adjustments thereof to facilitate speed-setting of the engine for constant speed operation at any selected speed within its operating speed range.

The fuel system of the present invention embodies in respect to each of the aforementioned air and fuel control means, a flexible diaphragm control member movable in response to changes in cylinder suction pressure reflected in the air inlet manifold of the engine, and operatively connected to both an air throttle valve and a fuel valve such that it simultaneously adjusts the setting of the valves in accordance with engine speed requirements.

For engine speed setting regulation, each diaphragm control member is provided with a speed governor means imposing resistance to suction displacement of the diaphragm, such governor means being constituted herein by a spring-loading mechanism adjustable in its resistance effect upon the diaphragm. A manual control common to the governing means, affords simultaneous, corresponding adjustments of the spring loading on the control diaphragms, whereby to permit and facilitate speed setting of the engine for constant speed operation at any selected speed.

Other and further features, objects, and advantages of the present invention will be apparent to one skilled in the art from the following detailed description taken in connection with the accompanying drawings.

On the drawings:

Figure 1 is a side elevational view of an engine fuel mixture delivery and a housing enclosing a fuel control mechanism constructed in accordance with the teachings of the present invention.

Figure 2 is a horizontal sectional view taken on line II—II of Figure 1.

Figure 3 is a vertical sectional view taken on line III—III of Figure 2.

Figure 5 is a horizontal sectional view taken on line V—V of Figure 3.

As shown on the drawings:

Figure 4:
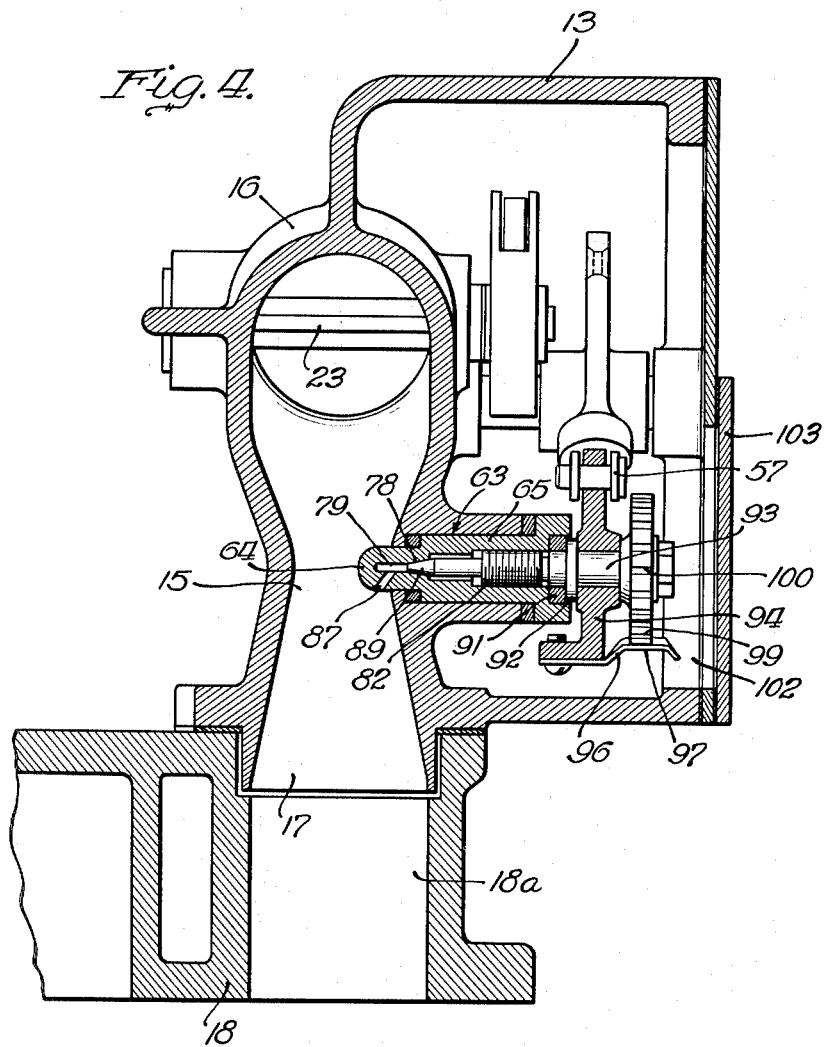
Figure 4 is a vertical sectional view taken on line IV—IV of Figure 3.

In Figures 1, 2, and 3 the reference numeral 10 indicates generally a casing forming an air supply manifold having a central, substantially tubular body portion 12 and two identical, but oppositely disposed, closed end housings 13. Since the two end housings and the mechanism mounted therein are identical, although positionally reversed, the several corresponding parts thereof will be designated hereinafter by the same reference numerals.

Each end housing 13 is secured to the body portion 12 by capscrews 14. A generally tubular, L-shaped or elbow-form conduit 16 is integrally formed in the end housing and provides a continuation of the air flow passage defined by the tubular body portion 12. The end portion of the conduit 16 remote from the tubular body 12, is here formed to provide a venturi passage 15 extending to the open end 17 of the conduit and presenting a venturi throat 11 within the passage. Passage 15 constitutes a fuel and air mixing chamber or space, as will be referred to hereinafter. The lower open end 17 of the conduit 16 extends through the lower wall of the end housing and communicates with a short passage or opening 18a in an adapter plate 18. The end housings 13 may be rigidly secured to the adapter 18 by a plurality of bolts 18b, Figure 3, while the adapter may be secured to the cylinder block 19 by bolts 19a.

A special feature of this invention resides in the positioning of the fuel mixing chamber immediately adjacent the fuel inlet port of the cylinder. As seen in Figure 3, the cylinder block 19 is provided with a passage 19b which is in communication with the conduit 16 through the adapter passage 18a. A poppet valve 20, of standard construction and operation, controls the passage of the fuel mixture through a port 21 into a passage 21a, in a cylinder head 21b, which leads to the cylinder. It is evident that, since the fuel mixing chamber is so close to the cylinder inlet port, a uniform fuel mixture will be delivered to the cylinder.

A control chamber 22, Figure 2, is provided in each end housing. This chamber 22 has a portion 22a extending alongside of the angular conduit 16 and a portion 22b at one end of the conduit 16.

A throttle valve 23 which may be of the butterfly type, is pivotally mounted in each conduit 16 anterior to or on the upstream side of the venturi passage 15, by means of a shaft 24 that is rotatably journalled in bushings 25 disposed in aligned openings in the conduit 16. One end 26 of the shaft 24 extends entirely thru the wall of the conduit 16 and projects a short distance away from the outside surface thereof. A short lever 27, Figure 3, is adjustably secured to this projecting end 26 by a setscrew 28. The throttle valve 23 is moved between open and closed position by a flexible diaphragm 30 acting on shaft end 26 through a lever system 32, Figure 3. This lever system 32 includes a lever 35 that is keyed at one end by a setscrew 36 (Figure 3) to a rod 37 that is rotatably journalled in the sidewalls of the end housing 13 (Fig. 2). At its other end the lever 35 has an elongated slot 39 (Fig. 3) pivotally receiving a pin 40 that is keyed to one end of a push rod 42. The push rod 42 is secured by nuts 44 and 45 to the center of the flexible diaphragm 30, the latter having its outer peripheral edge clamped by bolts 46, in air tight engagement between a dished circular retainer plate 47 and a circular, dished, support member 48 integrally formed on the end wall 50 of the conduit 16. The space between the outer face of the support member 48 and the inner surface of the diaphragm 30 communicates by means of a restricted orifice or aperture 52, with the air intake passage of conduit 16 at a point between the throttle valve 23 and the venturi throat 11. The space on the opposite side of the diaphragm 30 is vented to atmosphere, as by means of a port 53. Thus the diaphragm will be subjected to atmospheric pressure on one side, and on the other side to cylinder suction pressure or intake vacuum reflected in the conduit 16 and effective on the diaphragm through port 52. The position that the diaphragm, and consequently the push rod 42, will assume will be dependent upon fluctuations in cylinder intake vacuum.

Movements of the push rod 42 will cause the lever 35 to rock the shaft 37 which in turn, causes an angular movement of a lever 55 (Figs. 2 and 3) which is adjustably keyed to the shaft 37 by a setscrew 56. At its remote end, the lever 55 is pivotally attached to a link 57 (Fig. 3) that carries a laterally-extending stud 58, Figure 2. A rigid link 60 is pivotally mounted at one end on the stud 58, with a spacer washer 61 disposed over the stud between the two levers. The opposite end of the link 60 is pivotally connected to the short lever 27 which is keyed to the end 26 of the throttle valve shaft 24. Thus movement of the diaphragm push rod 42 causes opening or closing of the throttle valve 23, as by means of the levers 35, 55, 60 and 27.

Fuel is delivered to the restricted portion or throat 11 of the venturi passage 15 through a needle valve controlled nozzle assembly 62 (Figs. 4 and 5) which includes a guide sleeve 63. The sleeve has a stepped configuration with a forward, reduced diameter end 64 extending into the restricted throat of the venturi passage 15, a central portion 65 of larger diameter, fitting snugly in a bore 66 of a lateral extension 67 of the wall of the venturi. A washer 68 is disposed between the shoulder 69 formed at the forward end of the central portion 65, and an annular shoulder 70 at the inner end of the bore 66. A second sealing washer 73 is disposed between an enlarged, annular end flange 72 on member 63 and the annular end wall of the lateral extension 67. Capscrews 74, Figure 5, hold the guide sleeve 63 in position.

The sleeve 63 has a central bore of generally stepped configuration defined by a forward fuel flow passage 77, a frusto-conical valve seat 78, a fuel delivery passage 79, and a rear internally threaded portion 80 which receives the threaded shank 81 of an elongated fuel control valve member 82. Fuel is delivered to the fuel passage 79 through two intersecting passages 83 and 84, Figures 3 and 5, drilled in the housing wall, and two radially extending passages 85 in sleeve 63 that establish flow communication between the entrance passage 79 and an annular groove 86 that is cut in the periphery of the sleeve 63 at the point where the passage 83 opens into the bore 66. Fuel is discharged from the nozzle assembly through a slanted port 87 (Fig. 4) in the forward projecting end 64 of the guide sleeve 63.

The fuel control or metering valve 82, Figure 4, is provided with a frusto-conical seating portion 89 that is movable toward or away from engagement with the valve seat 78 of the sleeve 63 when the control valve is threaded in or out of the sleeve. A washer 91 is disposed around the shank 81 of the control valve and is pressed in fluid sealing engagement between the rear wall of the sleeve 63 and an annular flange 92 integrally formed on the valve. The control valve 82 also has a bearing portion 93 on which a lever 94 is rotatably journalled. The lever 94 is pivotally connected at one end to the short link 57 (Fig. 3) and carries at the other end a spring clip 96. A flexible finger portion 97 of the clip engages in driving engagement with notches 99 in the periphery of an indexing knob 100 that has a splined engagement with an end portion 101 of the fuel control valve 82.

Thus, when the link 57 is moved longitudinally by the diaphragm 30 and the associated linkage 32, the lever 94 will rotate the fuel control valve in a corresponding rotation to move the seating portion 89 relative to the valve seat 78, whereby to regulate fuel quantity admission to the venturi passage 15. The indexing knob 100 has numerical indicia on its face indicating the amount of opening of the valve. This knob is accessible for manual adjustment, through a side opening 102 in the housing normally closed by a removable cover plate 103.

Describing now the engine speed governing control provision of the present invention, referring to Figure 3, it will be noted that when each lever 55 is pivoted in a counterclockwise direction about the center of the shaft 37, it moves against the resistance of a coil spring 105 which is connected between the lever 55 and an arm 106. The arm 106 is keyed by a setscrew 107, on a shaft 108 (Fig. 2) that is secured in the walls of the housing 13 with one end 109 projecting exteriorly of the housing. As best seen in Figure 1, the shaft ends 109 from both housings 13 are connected for conjoint operation, as by an adjustable link 110 that is pivotally connected at one end to a short arm 112 of a control lever 113 that is keyed, as by setscrew, to one shaft extension 109. At its other end the link 110 is pivotally connected to a short lever 116 that is keyed to the other shaft extension 109. The short arm 112 and the short lever 116 are of equal effective length, so that movement of the control lever 113 will cause the spring at one end to be tensioned the same amount as the spring at the other end.

It will be evident that when the control lever 113 is moved to the "slow" engine speed position, illustrated in Figure 1, the springs at both ends will be tensioned a maximum amount due to the movement of the levers 112 and 116. Conversely, movement of the control lever 113 to the "fast" engine speed position relieves the tension of the springs. The lever 113 is held in the selected position by a pawl 115 that engages notches 118a in a plate 118 formed on one end housing 13.

An adjustable stop pin 119, Figure 3, is threaded through the end wall of each housing 13 in alignment with the lever 55. When the lever 55 abuts the stop pin 119 the fuel valve will be closed to a minimum or idling setting.

In the preferred embodiment of the present invention, a fuel tank 120 is mounted below the central section 12 of the air inlet manifold, between the two end housings 13. Fuel is drawn from the tank and delivered to each fuel passage through a tube 121 which is connected to a pipe 122 that communicates with the bottom zone of the tank 120. A ball check valve 123 is provided in each pipe 122 to prevent backflow of fuel.

The air manifold 12 has a central tubular member 124 providing an inlet passage 125. A choke valve 126 is pivotally mounted in the walls of the tubular member. A hand control member 127, Figure 1, is pivotally connected to a short lever 128 which is keyed to the shaft of the choke valve 126.

An engine using the present fuel system is started in the following manner. When the engine is not operating, the needle valve 82 and the throttle valve 23 are in wide open position. The manually operated choke valve 126 is closed to give a rich mixture, and then the engine is cranked. As the engine starts, the choke is gradually released until the engine runs evenly. Then the hand control lever 113 is set at the required speed. Should the engine run at a higher rate of speed, the cylinder vacuum reflected in the conduit 16 and effective upon the diaphragm 30, will cause the diaphragm to act against the tension of the speed governor spring 105, to move both the fuel valve and the throttle valve toward the idling position defined by the stop pin 119. If the engine slows down due to increased load or for other reasons, the fuel and throttle valves are correspondingly opened.

In this manner, fuel mixture delivery to each cylinder is regulated and controlled by the fuel and air control provision acting in response to variations in cylinder suction pressure and to an extent determined by the setting of the speed governor spring, such as to adjust engine fueling for effecting constant speed operation of the engine at a speed corresponding to the governor setting. While the governor springs associated with the several fuel mixture control means, are adjusted to corresponding or like settings, as effected through the described common manual adjustment device, it will be evident that since the mixture controls are individual to the engine cylinders, each will perform in an independent manner, to adjust the fueling of its associated cylinder according to the particular demands thereof in engine operation at any selected constant speed.

It is to be observed moreover, that the present fueling system assures cylinder delivery of a proper fuel and air mixture, as mixing of the fuel constituents is produced in a mixing passage or chamber which is relatively close to the valve-controlled intake passage of the cylinder. Furthermore, by providing each cylinder with its own fuel mixing and delivery device of the character now described, improved fueling of the cylinder is obtained.

It will be understood that modifications and variations may be effected without departing from the scope of the novel concepts of the present invention.

I claim:

1. In combination, an air inlet conduit, means for delivering a quantity of fuel to said conduit including a fuel conduit with an internally threaded bore, a valve seat in said fuel conduit, a valve stem having a threaded shank engaging said threaded bore and a seating end portion movable toward said valve seat for restricting the flow of fuel through the fuel conduit, a notched wheel keyed to said stem, rotary movement of said wheel effecting adjustment of said seating end relative to said valve seat, a control member movable through a fixed range, and a spring arm secured to said control member and having an end resiliently pressed into a notch on said wheel for oscillating said valve stem through a range of angular movement corresponding to the range of movement of said control member, said wheel being rotatable independently of said control member upon disengaging said spring arm end from said notched wheel whereby the initial position of said seating portion relative to said valve seat may be varied.

2. In combination, a housing affording two spaced control chambers and a passage communicating said chambers with each other, means for supplying air to said passage, a conduit extending through each chamber having one end in flow communication with said passage and the other end defining a discharge port, means for delivering metered quantities of liquid fuel into each conduit near said discharge port for mingling with the air therein, a shaft pivotally mounted across each conduit on the upstream side of said fuel entrance point, a throttle valve mounted on said shaft, a pressure-sensitive device in each chamber having a member movable in response to variations in pressure in said air passage, a linkage in each chamber connecting said movable member to said throttle valve and said fuel metering means, each of said linkages comprising a plurality of levers pivotally mounted inside said housing, an arm adjustable between fixed positions, and a spring connected between said arm and one of said levers and resisting movement of said movable member as it moves said fuel metering means and throttle valve toward closed positions.

3. In combination, an elongated housing defining a pair of spaced control chambers with a passage therebetween, means for introducing air to said passage, a conduit in each control chamber in flow communication with said passage, a throttle valve in each conduit, a venturi in each conduit close to the throttle valve therein, fuel metering means operatively associated with each venturi for controlling admission of liquid fuel thereto, a pressure-sensitive member for each control chamber and movable in response to pressure variations in the control chamber conduit between the throttle valve and venturi therein, linkage means in each control chamber connecting the pressure-sensitive member associated with the control chamber to the throttle valve and fuel metering means in the conduit of the control chamber, an adjustably tensioned spring connected to each linkage means for regulating pressure responsive movement of the associated pressure-sensitive member, and control lever means connected to said springs and operable for effecting tension adjustments thereof.

4. Engine fueling means for an internal combustion engine having a cylinder fuel intake port, comprising, conduit means having one end in communication with the cylinder intake port, said conduit means having an air admission opening, a fuel supply valve for delivering fuel into said conduit means, an adjustable throttle valve to control air flow through said conduit means, a linkage system connecting said fuel valve and throttle valve for conjoint operation, a spring connected to said linkage system to urge said linkage system in a direction to open said fuel and throttle valves, a diaphragm connected to said linkage system and subjected to the pressure in said conduit means normally effective to urge said linkage system in a direction to close said valves, and means for varying the force exerted on said linkage system by said spring.

References Cited in the file of this patent

UNITED STATES PATENTS

| Number | Name | Date |
|---|---|---|
| 917,264 | De Tray | Apr. 6, 1909 |
| 1,222,400 | Heftler | Apr. 10, 1917 |
| 1,528,793 | Riotte | Mar. 10, 1925 |
| 1,612,306 | Nelson | Dec. 28, 1926 |
| 1,791,490 | Dilworth | Feb. 10, 1931 |
| 1,920,174 | Harris | Aug. 1, 1933 |
| 2,318,008 | Morris | May 4, 1943 |
| 2,405,563 | Enright | Aug. 13, 1946 |
| 2,428,377 | Morris | Oct. 7, 1947 |
| 2,432,980 | Abell | Dec. 23, 1947 |
| 2,439,472 | Jackson | Apr. 13, 1948 |
| 2,595,720 | Snyder | May 6, 1952 |
| 2,595,721 | Snyder | May 6, 1952 |